(12) United States Patent
Rodde et al.

(10) Patent No.: US 6,361,279 B1
(45) Date of Patent: Mar. 26, 2002

(54) BLADE PROFILE FOR AIRCRAFT ROTOR AND ROTOR COMPRISING SAME

(75) Inventors: Anne Marie Rodde, Verrieres le Buisson; Joël Reneaux, Orsay; Jean Jacques Thibert, Verrieres le Buisson, all of (FR)

(73) Assignees: Office National d'Etudes et de Recherches Aerospatiales (ONERA), Chatillon; Eurocopter, Marignane Cedex, both of (FR)

( * ) Notice: Subject to any disclaimer, the term of this patent is extended or adjusted under 35 U.S.C. 154(b) by 0 days.

(21) Appl. No.: 09/355,353
(22) PCT Filed: Jun. 5, 1998
(86) PCT No.: PCT/FR98/01147
    § 371 Date: Jul. 28, 1999
    § 102(e) Date: Jul. 28, 1999
(87) PCT Pub. No.: WO99/00298
    PCT Pub. Date: Jan. 7, 1999

(30) Foreign Application Priority Data

Jun. 25, 1997 (FR) .............................................. 97 07915

(51) Int. Cl.[7] .............................. B64C 11/18; B64C 3/10
(52) U.S. Cl. ............. 416/223 R; 416/242; 416/DIG. 2; 244/35 R
(58) Field of Search .......................... 416/223 R, 228, 416/242, DIG. 2, DIG. 5, 238; 244/35 R

(56) References Cited

U.S. PATENT DOCUMENTS

| | | | |
|---|---|---|---|
| 3,728,045 A | 4/1973 | Balch | |
| 4,142,837 A | 3/1979 | de Simone | 416/223 R |
| 4,314,795 A | 2/1982 | Dadone | 416/223 R |
| 4,325,675 A | 4/1982 | Gallot et al. | 416/223 R |
| 4,392,781 A * | 7/1983 | Mouille et al. | 416/223 R |
| 4,412,664 A | 11/1983 | Noonan | 416/223 R |
| 4,416,434 A * | 11/1983 | Thibert et al. | 416/223 R |
| 4,459,083 A | 7/1984 | Bingham | 416/223 R |
| 4,569,633 A | 2/1986 | Flemming, Jr. | 416/228 |
| 4,744,728 A | 5/1988 | Lednicer et al. | 416/223 R |
| 4,830,574 A | 5/1989 | Wainauski et al. | 416/223 R |
| 4,911,612 A * | 3/1990 | Rodde et al. | 416/223 R |
| 5,344,102 A * | 9/1994 | Nakadate et al. | 416/223 R |

FOREIGN PATENT DOCUMENTS

| | | |
|---|---|---|
| EP | 0517467 | 9/1992 |
| FR | 2463054 | 8/1983 |
| FR | 2485470 | 10/1983 |

OTHER PUBLICATIONS

PCT International Search Report dated Sep. 14, 1998.
Abbott, et al., "Theory of Wing Sections Including a Summary of Airfoil Data," Dover Publications, Inc., Jun. 1958, pp. 111–113.

* cited by examiner

Primary Examiner—Edward K. Look
Assistant Examiner—Richard Woo
(74) Attorney, Agent, or Firm—Stevens, Davis, Miller & Mosher, LLP

(57) ABSTRACT

The invention concerns a blade profile for aircraft rotor, comprising, between a leading edge (1A) and a trailing edge (1B), a suction face (2) and a blade face (3) whereof the geometric locus of the equidistant points of the latter defines the curvature. The invention is characterised in that the value of the ratio of the maximum curvature to the maximum thickness develops linearly with the profile (1) relative thickness and ranges between 0.13 and 0.19 for a relative thickness of 7% of the chord (C) and ranges between 0.18 and 0.24 for a relative thickness of 15% of the chord (C).

14 Claims, 13 Drawing Sheets

BLADE PROFILE FOR AIRCRAFT ROTOR AND ROTOR COMPRISING SAME

BACKGROUND OF THE INVENTION

1. Field of the Invention

The present invention concerns the aerodynamic profiles used to generate lift on rotorcraft and is more particularly concerned with a family of profiles for helicopter rotor blades.

2. Description of the Related Art

An aerodynamic profile is generally defined by a table of dimensions. This sets out:

a fixed maximal thickness, the position of this maximal thickness is fixed, a fixed maximal relative camber, and the position of this maximum camber is fixed.

From a given profile any process can be used to generate profiles having different relative thickness to form a family of profiles. The process employed may or may not preserve the position of the maximal thickness, the value of the camber and its position.

In the case of helicopter rotor blades the combination of the rotor rotation speed and the speed of the helicopter generates at the upwind blade (blade azimuth angle $\psi$ in the range 0° to 180°) relative Mach numbers varying from approximately 0.3 at the blade root to 0.85 at the blade tip and at the downwind blade (blade azimuth angle $\psi$ in the range 180° to 360°) much lower Mach numbers from 0.4 at the blade tip to 0 or even negative values (profiles leading by the trailing edge) in the inversion circle near the rotor hub.

Because of this the kinetic pressure varies along the blade and in accordance with the blade's azimuth position. To balance the aircraft it is necessary for the lift Cz and consequently the angle of incidence to be low at the upwind blade and high at the downwind blade. During one rotation of the blade the profiles constituting it alternately encounter high relative speeds and low angles of incidence and then moderate relative speeds and high angles of incidence. The speed (or Mach number) and the angle of incidence encountered by the profile depend on their spanwise position along the blade.

To define blades having high performance, that is to say minimising the power needed to rotate the rotor and/or enabling the aircraft to fly with an extended flight envelope in terms of lift and speed, it is necessary to use profiles offering high performance in all operating conditions. To minimise torsion forces on the blade and control forces on the pitch control rods, these profiles must have very low pitch moment coefficients throughout their range of operation. Finally for structural reasons, it is beneficial to construct blades whose thickness varies spanwise, being thicker at the root end and thinner at the tip.

Designing a helicopter blade offering high performance therefore requires a family of profiles, each profile having geometrical and aerodynamic characteristics that are well suited to the operating conditions encountered according to its spanwise position along the blade. The family of profiles must also be homogenous, that is to say all the profiles must have similar levels of performance as otherwise the performance of the blade will be limited by the performance of the worst profiles.

Various profiles or families of profiles are described, in particular in U.S. Pat. No. 3,728,045 (Balch), U.S. Pat. No. 4,142,837 (De Simone), U.S. Pat. No. 4,314,795 (Dadone), U.S. Pat. No. 4,569,633 (Flemming) and U.S. Pat. No. 4,744,728 (Ledciner) and in patent EP-0 517 467 (Nakadate). In the patents describing families of profiles the latter are generated from a base profile using two different processes:

the first process consists in defining the profiles using a unique camber law or skeleton and a law of thickness relative to the maximal relative thickness. This technique is described in "Theory of wing sections" by H. Abbot and E. Von Doenhoff published by McGraw-Hill in 1949. Profiles of different thickness are obtained by applying a multiplier coefficient to said thickness law which is therefore the same for all the profiles;

a second process, starting from a base profile whose extrados and intrados Y-axis coordinates are defined by a table of values, consists in defining the other profiles by applying a multiplier coefficient to these coordinates, the multiplier coefficient possibly being different for the extrados and for the intrados.

The Balch and De Simone patents define profiles having a relative thickness around 10% which cannot be used to define a blade with an evolving profile having performance adapted to suit its spanwise position.

The Dadone patent describes a family of profiles obtained by the second process.

The Flemming patent describes a family of profiles that can be generated by either of the two processes.

The Ledciner and Nakadate patents describe families of profiles generated by the second process in both cases.

However, the families of profiles like those described above do not yield profiles having geometrical characteristics adapted in accordance with the relative thickness, i.e. profiles all offering high performance, and consequently do not yield high performance blades. Accordingly, in the families described previously, the position of the maximum camber and the value of the maximal camber do not vary with the relative thickness or vary in a non-optimal manner. Likewise, the relative thickness between 20% of the chord and the position of the maximal thickness does not change with the relative thickness or changes non-optimally. Thus these families of profiles do not yield high performance blades even if the base profile of the family offers good performance because the performance of the blade is limited by the non-optimal performance of the derived profiles.

The family of profiles described in patents FR-2 463 054 and FR-2 485 470 have certain features, in particular the change in thickness between 20% of the chord and the position of the maximal thickness, which confer high performance on this family at low lift and high Mach numbers. On the other hand the cambers do not have features enabling the Cz levels to be increased significantly without reducing trans-sonic performance.

SUMMARY OF THE INVENTION

An aim of the present invention is to avoid these problems.

To this end, the blade profile in accordance with the invention for rotorcraft rotors comprising, between a leading edge and a trailing edge, an extrados and an intrados the camber of which is defined by the geometrical locus of points equidistant from them is noteworthy in that the ratio of the maximal camber to the maximal thickness varies in a linear fashion with the relative thickness of the profile and is in the range 0.13 to 0.19 for a relative thickness of 7% of the chord and is in the range 0.18 to 0.24 for a relative thickness of 15% of the chord.

The law of evolution of the ratio of the maximal camber to the maximal thickness as a function of the relative thickness is advantageously represented by the equation:

$$\frac{(c/C)_{max}}{(e/C)_{max}} = a_3 + b_3(e/C)_{max}$$

the values of the coefficients $a_3$ and $b_3$ being as follows:
$a_3 = 0.1177$,
$b_3 = 0.6114$.

Moreover, the position of the maximal camber evolves in a linear fashion with the relative thickness of the profile and is in the range 14% to 16% of the chord for a relative thickness of 7% and in the range 27% to 29% of the chord for a relative thickness of 15%.

The law of evolution of the position of the maximal camber is preferably represented by the equation:

$$\frac{Xc_{max}}{C} = a_2 + b_2(e/C)_{max}$$

the values of the coefficients $a_2$ and $b_2$ being as follows:
$a_2 = 0.0321$,
$b_2 = 1.6499$.

As explained in more detail below, these particular features of the camber and its position as a function of the relative thickness yields good performance in terms of maximal lift well matched to their position on the blade for all the profiles of the family in accordance with the invention.

Moreover, the ratio between the thicknesses at 20% of the chord and the maximal thickness varies in a linear fashion with the relative thickness and is in the range 0.957 to 0.966 for a relative thickness of 7% and in the range 0.938 to 0.947 for a relative thickness of 15%.

The law of evolution of this ratio advantageously is represented by the equation:

$$\frac{(e/C)X/C = 20\%}{(e/C)_{max}} = a_1 + b_1(e/C)_{max}$$

the values of the coefficients $a_1$ and $b_1$ being as follows:
$a_1 = 0.9779$,
$b_1 = -0.2305$.

Moreover, the blade profile in accordance with the invention is characterised by a maximal relative thickness position in the range 31% to 35% of the chord.

BRIEF DESCRIPTION OF THE DRAWINGS

The figures of the accompanying drawings explain how the invention can be put into effect.

DETAILED DESCRIPTION OF THE INVENTION

Figure 1:
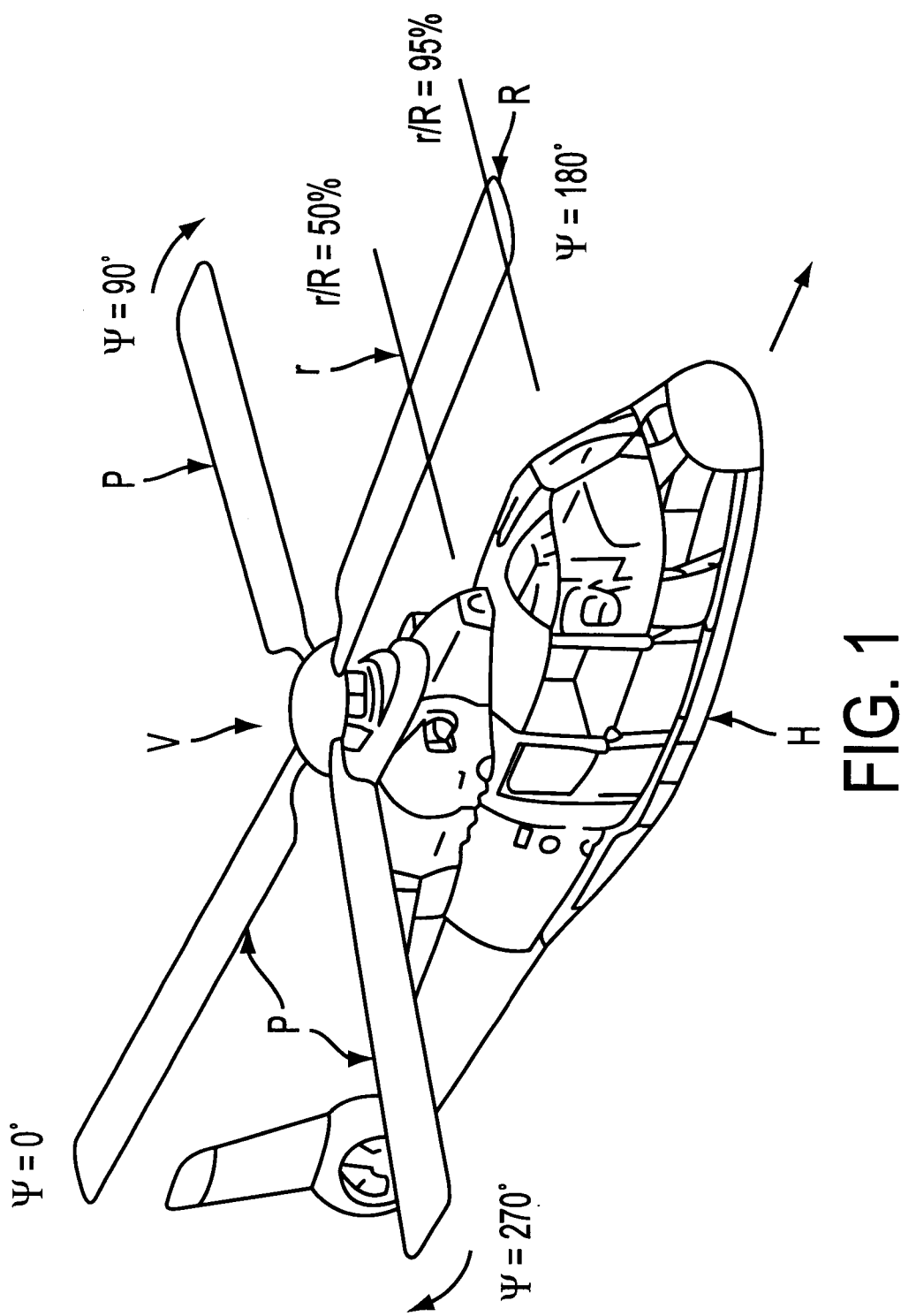
FIG. 1 is a schematic view of a helicopter with a rotor having four blades.

FIG. 1 shows a helicopter H having a rotor V with four blades P in forward flight with the various azimuth angles ψ, for example ψ=90° for the upwind blade and ψ=270° for the downwind blade. FIG. 1 also relates to two blade sections such that r/R=50% and r/R=95%, respectively, where R is the span of the blade and r is the position of the section concerned.

Figure 2:
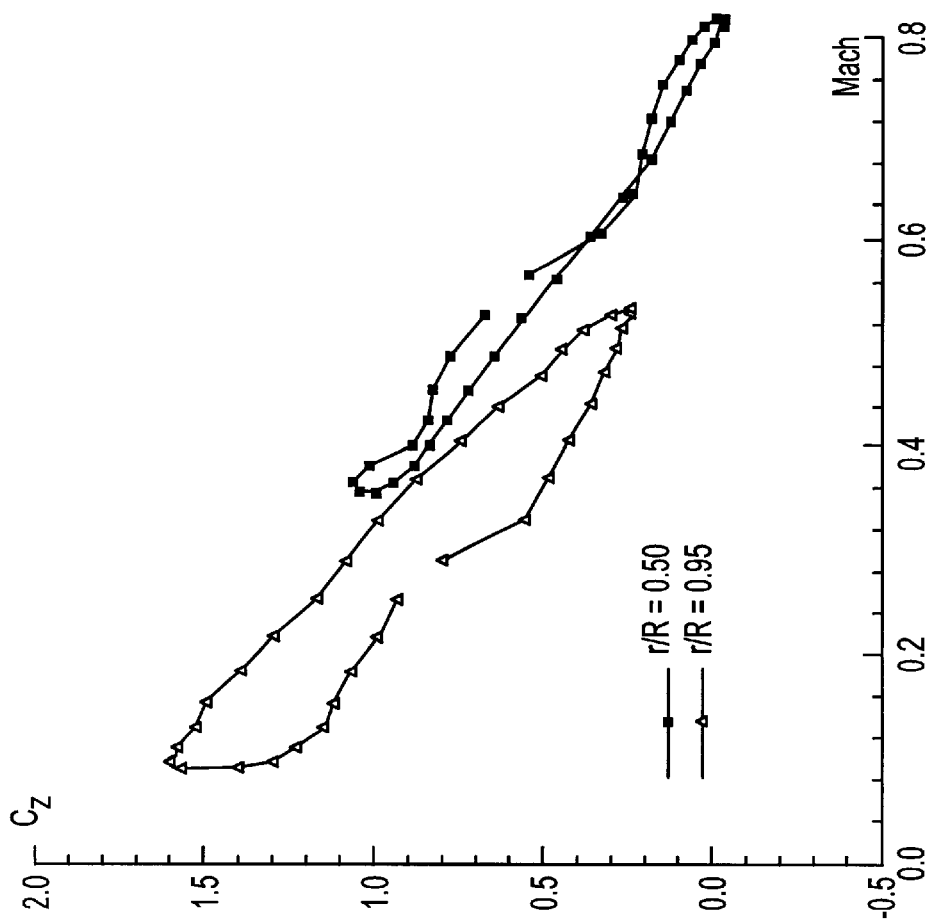
FIG. 2 is a diagram showing the variation in the Mach number and lift for two profiles at 50% and 95% of the span of a helicopter blade from FIG. 1 in forward flight.

FIG. 2 shows that helicopter blade profiles encounter different operating conditions in terms in Mach number and lift coefficient depending on their spanwise position on the blade and that, to design a high performance blade, it is advantageous to use profiles well matched to these operating conditions. This is shown in FIG. 2 in the case of a helicopter in forward flight at a moderate speed for two blade sections at 50% and 95% of the maximal span for the blade.

Figure 3:
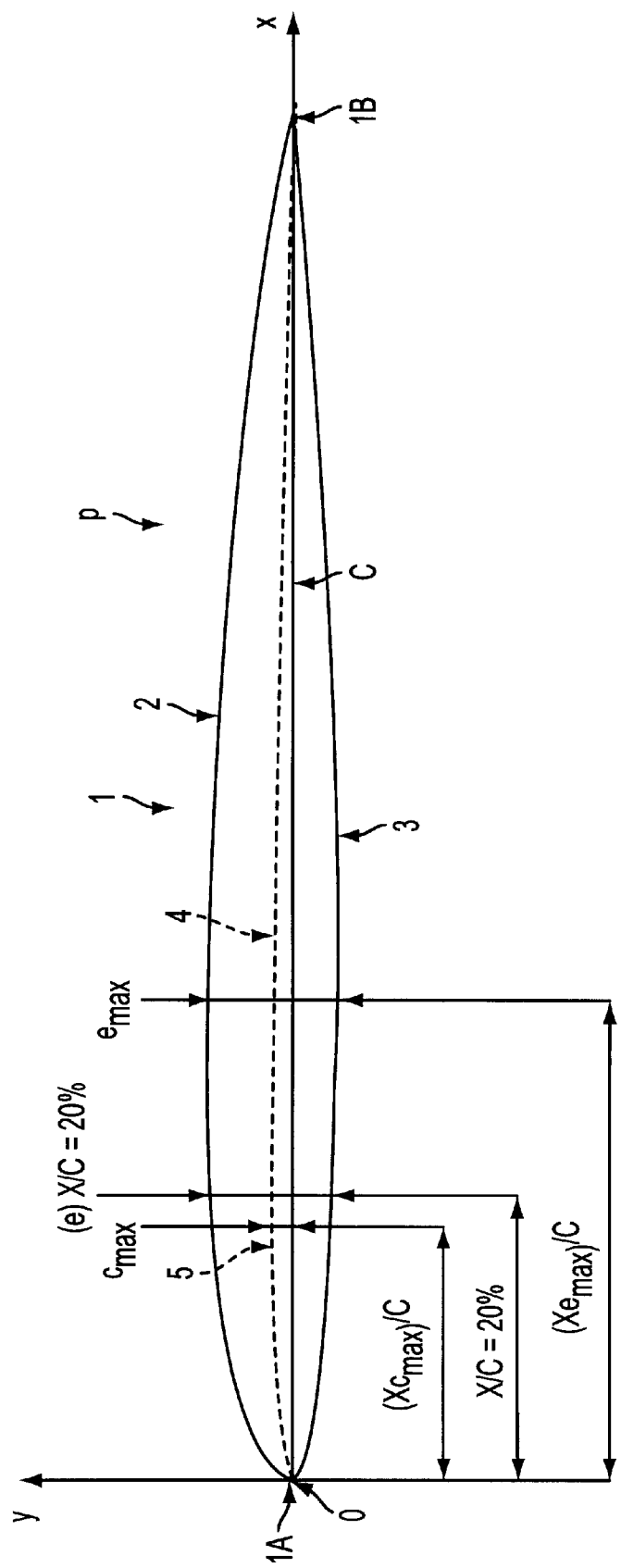
FIG. 3 is a general view of one blade profile from the family in accordance with the invention.

As shown in FIG. 3, a profile 1 of a blade P in accordance with the invention has an extrados (upper part) 2 and an intrados (lower part) 3 which merge at the leading edge 1A and at the trailing edge 1B. To facilitate the description the profile 1 in FIG. 3 is related to an orthogonal system of axes Ox, Oy with its origin O coincident with the leading edge 1A.

The Ox axis which passes through the trailing edge 1B is also coincident with the chord C of the profile.

The system of axes Ox, Oy, the positive directions of which are indicated by the arrows in FIG. 3, is the frame of reference for relative coordinates, that is to say X and Y coordinates referred to the length C of the chord of the profile. The external contour of a profile is determined with reference to a skeleton (mean line) 4 passing through the point O and the point 1B, which represents the geometrical locus of points equidistant from the lines 2 and 3.

The changing thickness of the profile between the lines 2 and 3 is characterised by the X coordinates of the point at which its thickness is maximal along the chord C of the profile and expressed as a value relative to the length of the chord (i.e. $(Xe_{max})/C$). A blade profile in accordance with the invention is also characterised by the value of the relative thickness at a relative X coordinate X/C=20%, which thickness can be normalised by the length of the chord.

A blade profile in accordance with the invention can also be characterised by the shape of its camber law 4, the locus of points at equal distances from the lines 2 and 3. The line 4 has maximal Y coordinate at a point 5. The position of the point 5 on the X axis relative to the chord is called the maximal camber position $(Xc_{max})/C$ and the Y coordinate at the point 5 relative to the chord is called the maximal camber value.

Figure 4:
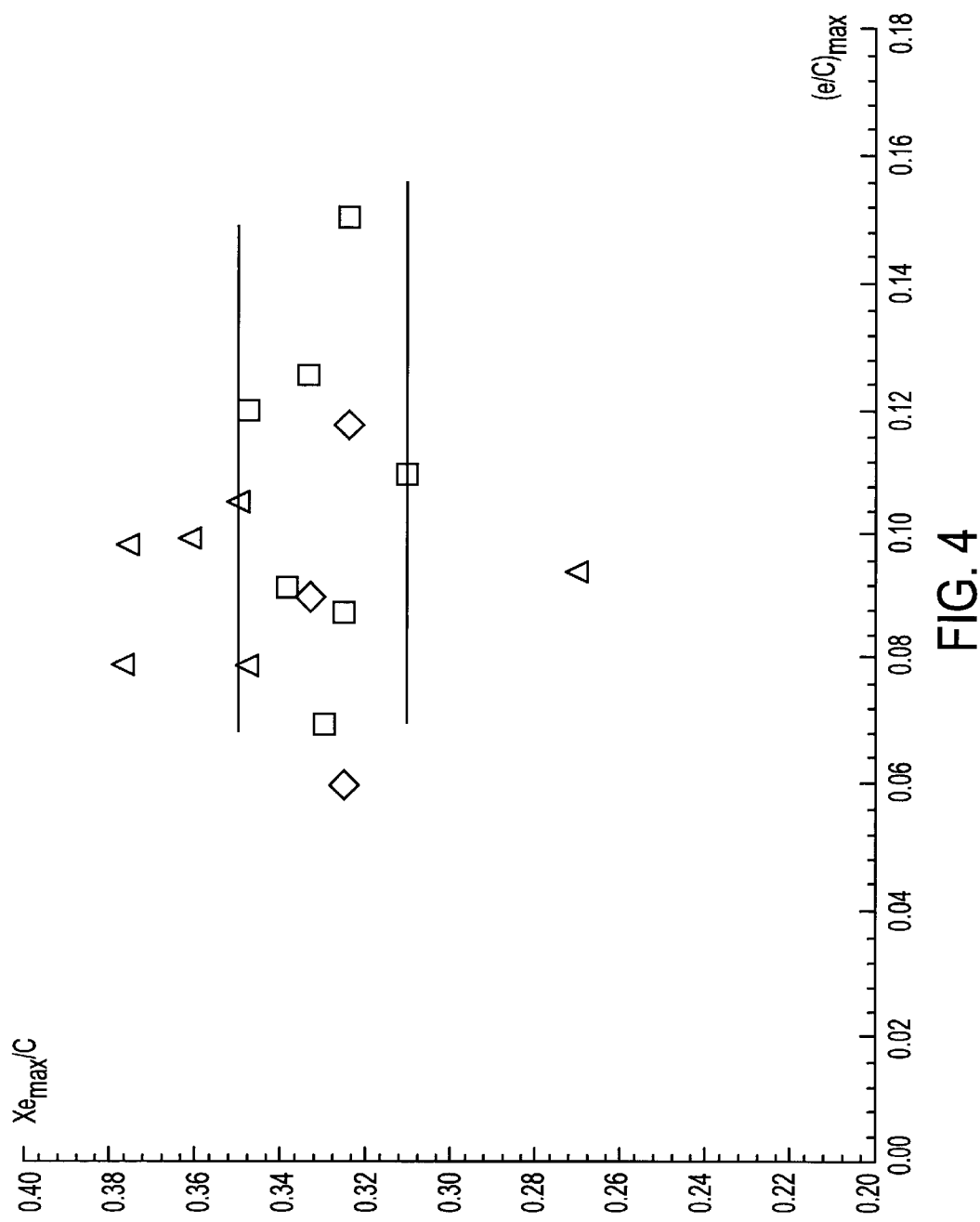
FIG. 4 is a diagram showing the positions of the maximal thickness of the blade profiles of the family in accordance with the invention and prior art profiles as a function of the maximal relative thickness.

FIG. 4 shows that for the family of blade profiles in accordance with the invention, indicated by the squares, the position of the maximal thickness $(Xe_{max})/C$ as a function of the maximal relative thickness $(e/C)_{max}$ is in the range 31% to 35% of the chord and is therefore closer to the leading edge than for the prior art families of profiles, indicated by the triangles and the lozenges.

Figure 5:
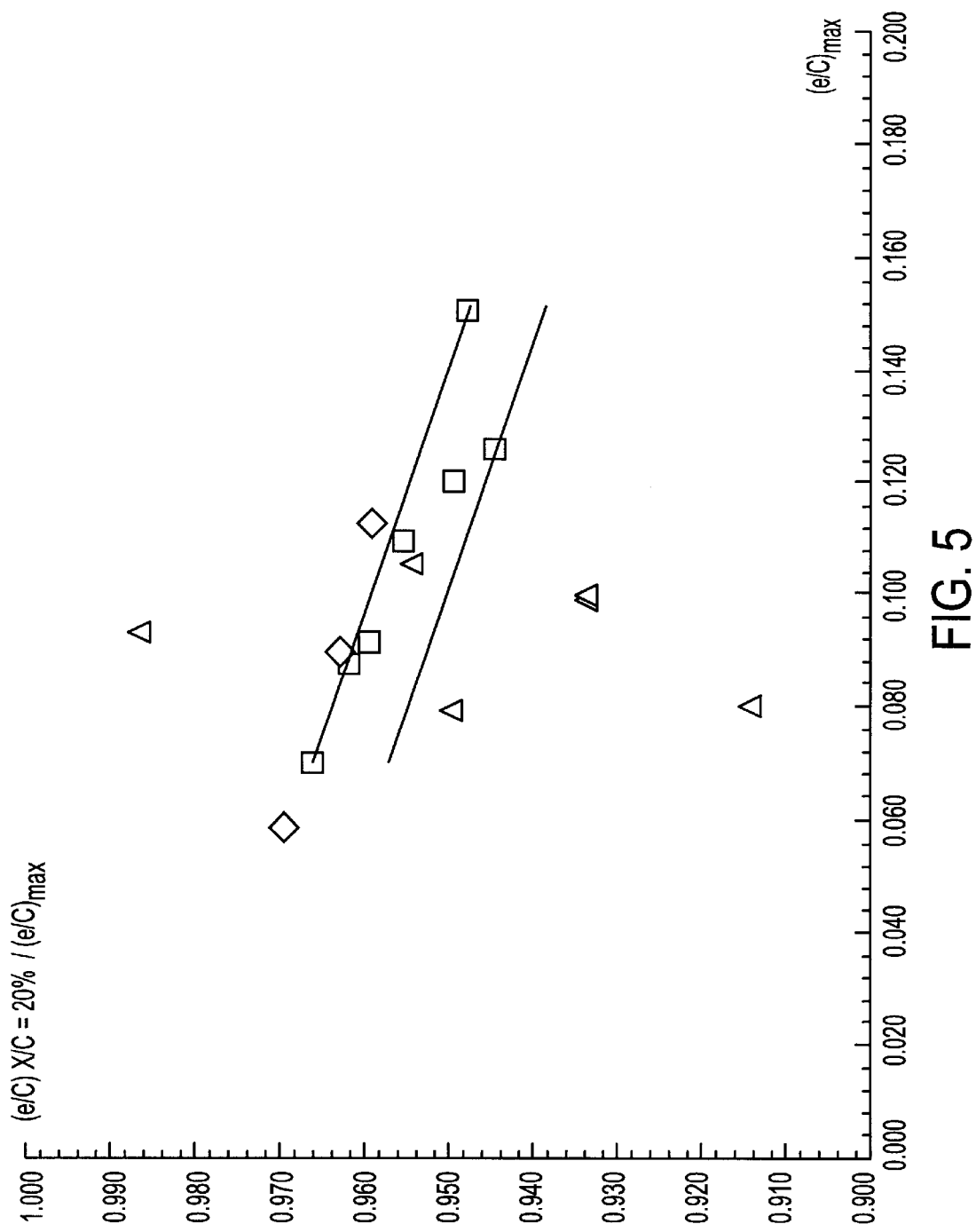
FIG. 5 is a diagram showing the ratio of the thickness of the blade profiles of the family in accordance with the invention at 20% of the chord to the maximal thickness as a function of the relative thickness and the same ratio for prior art families of profiles.

FIG. 5 shows that the ratio of the thickness at 20% of the chord to the maximal thickness decreases in a linear manner as the relative thickness increases for profiles of the invention (squares) whereas for the prior art families of profiles (triangles or lozenges) this ratio is constant or increases because of the process used to generate the families. For a 7% relative thickness profile a value of this ratio in the range 0.957 to 0.966 is preferably chosen. For a 15% relative thickness profile a value in the range 0.938 to 0.947 is preferably chosen. The law of evolution of this ratio can advantageously be represented by the following equation:

$$\frac{(e/C)X/C = 20\%}{(e/C)_{max}} = a_1 + b_1(e/C)_{max}$$

the values of the coefficients $a_1$ and $b_1$ being as follows:
$a_1=0.9779$,
$b_1=-0.2305$.

The evolution of the above ratio with the relative thickness enables the blade profiles of the family in accordance with the invention to have very good upwind blade performance for all maximal relative thicknesses in the range 7% to 15%. These particular features limit the intensity of the speed gradient at the extrados and at the intrados and reduce the intensity of the shock waves for operating conditions characterised by low Cz and high Mach number. Likewise, the more advanced position of the maximal thickness of the family in accordance with the invention reduces the intensity of recompression at the extrados over the rear part of the profile and consequently delays boundary layer separation for downwind blade operating conditions, i.e. low Mach number and high Cz.

Figure 6:
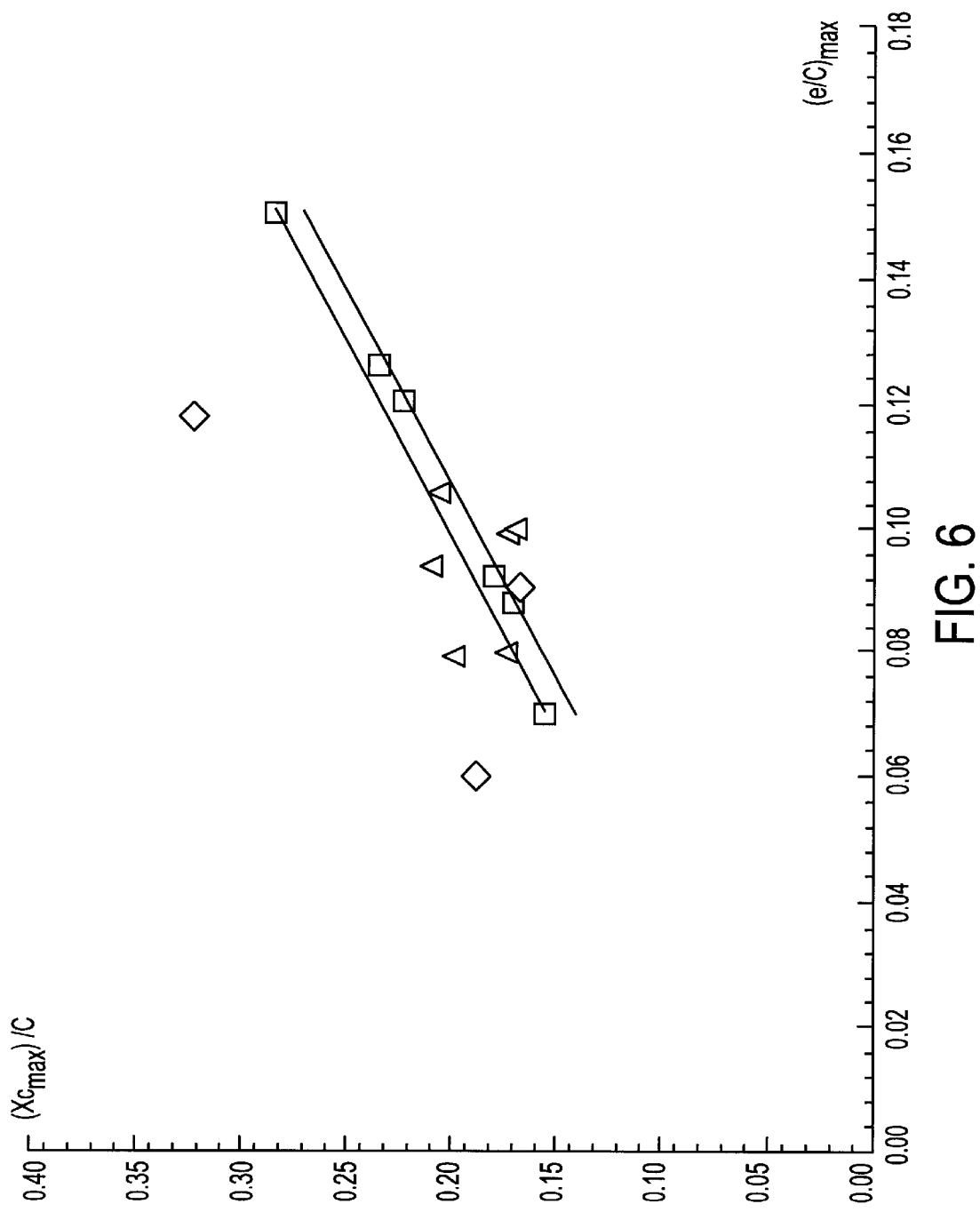
FIG. 6 is a diagram showing the position of the maximal camber expressed as a percentage of the chord as function of the relative thickness of the blade profiles of the family in accordance with the invention and the same position for prior art families of profiles.

FIG. 6 shows that for the family of blade profiles in accordance with the invention (squares) the position of the maximal camber changes in a linear manner with the relative thickness whereas this position is constant for the prior art families (triangles and lozenges) because of the process used to generate these families. For a 7% relative thickness profile a maximal camber position in the range 14% to 16% of the chord is preferably chosen. For a 15% relative thickness profile a position in the range 27% to 29% of the chord is preferably chosen.

This law of evolution of the position of the maximal camber can advantageously be represented by the following equation:

$$\frac{Xc_{max}}{C} = a_2 + b_2(e/C)_{max}$$

the values of the coefficients $a_2$ and $b_2$ being as follows:
$a_2=0.0321$,
$b_2=1.6499$.

Figure 7:
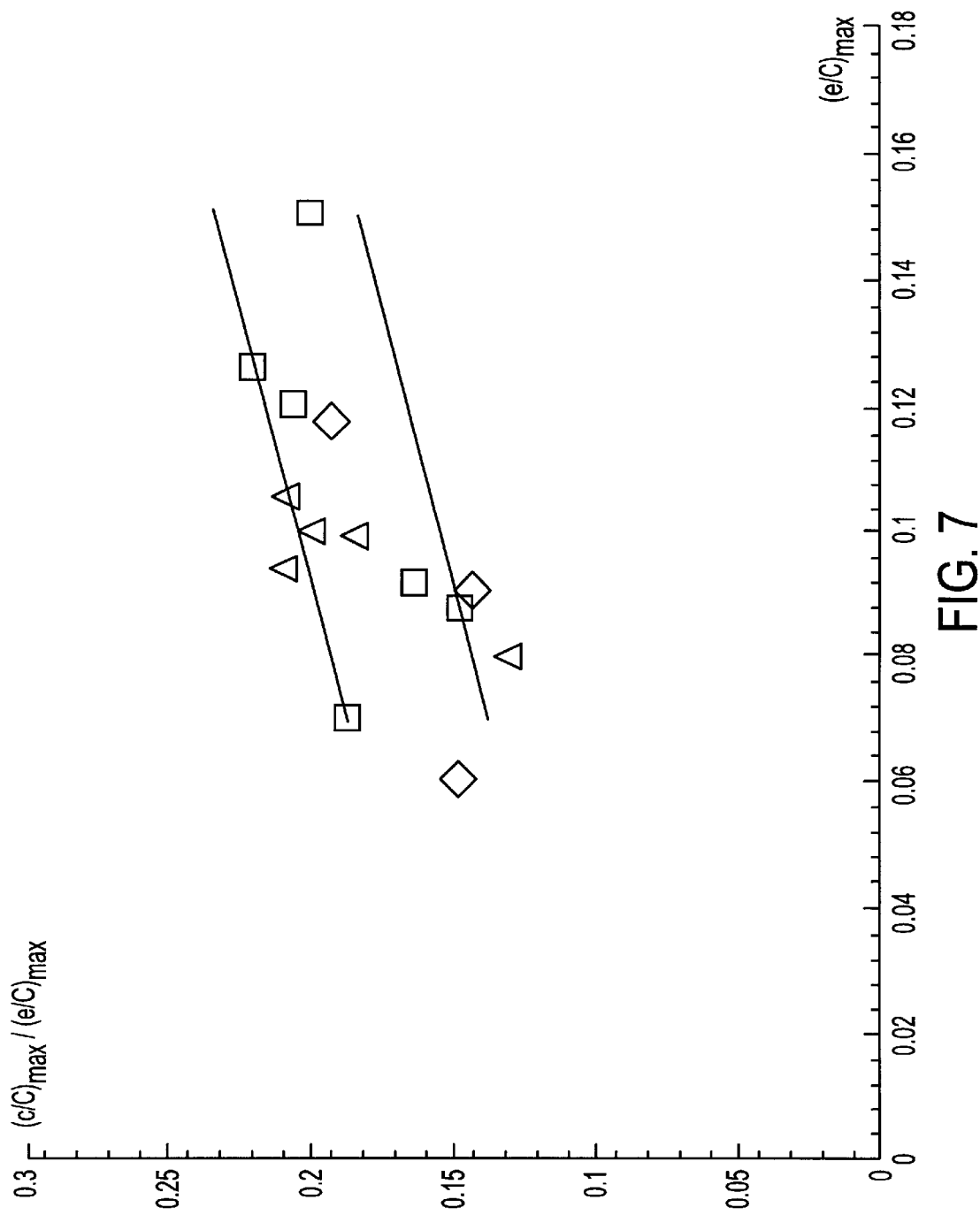
FIG. 7 is a diagram showing the ratio of the value of the maximal camber to the maximal relative thickness of the blade profiles of the family in accordance with the invention as a function of the relative thickness and the same ratio for prior art families of profiles.

FIG. 7 shows that for the family of blade profiles in accordance with the invention (squares) the ratio of the maximal camber to the maximal thickness $(C/C)_{max}/(e/C)_{max}$ evolves in a linear fashion with the relative thickness $(e/C)_{max}$ whereas it is constant for the prior art families of profiles. For a 7% profile of the family in accordance with the invention a ratio in the range 0.13 to 0.19 is preferably chosen. For a 15% relative thickness profile a value in the range 0.18 to 0.24 is preferably chosen. The law of evolution of the ratio of the maximal camber to the maximal thickness as a function of the relative thickness can advantageously be represented by the following equation:

$$\frac{(c/C)_{max}}{(e/C)_{max}} = a_3 + b_3(e/C)_{max}$$

the values of the coefficients $a_3$ and $b_3$ being as follows:
$a_3=0.1177$,
$b_3=0.6114$.

These particular features of the camber and its position as a function of the relative thickness confer on all profiles of the family in accordance with the invention maximal lift performance well suited to their position on the blade.

Accordingly, for thin profiles in the outer part of the blade the cambers are moderate and the position of the maximal camber is advanced which limits leading edge overspeed at high Cz and delays boundary layer separation whilst preventing high overspeed at the intrados near the leading edge and therefore shockwaves at low levels of lift.

Figure 8:
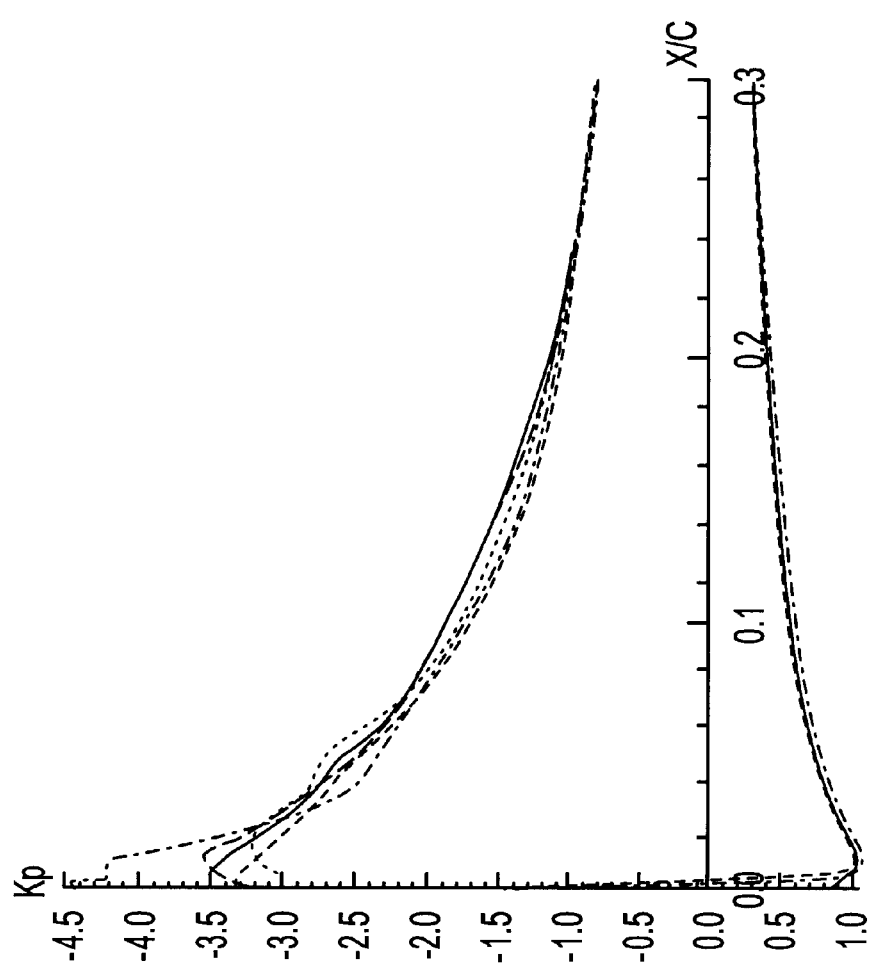
FIG. 8 is a diagram showing the pressure coefficients near the leading edge for a Mach number of 0.4 and a Cz of 1 for an 8% relative thickness profile of the family in accordance with the invention and prior art profiles having the same relative thickness.
Figure 9:
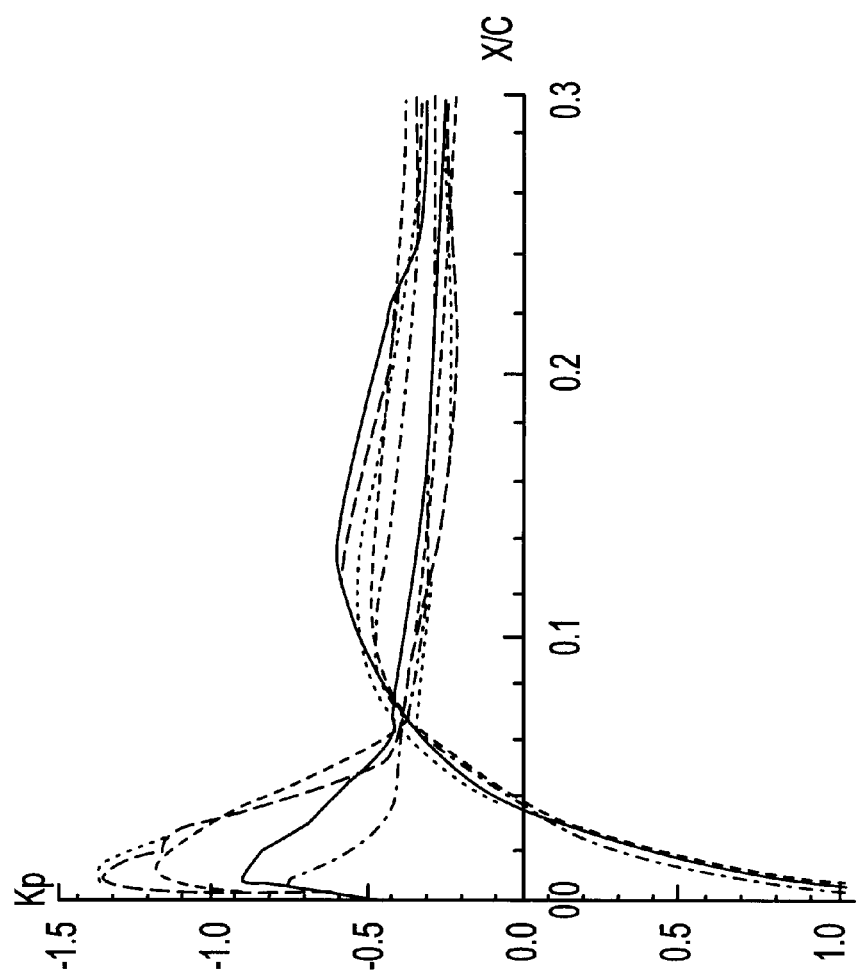
FIG. 9 is a diagram showing the pressure coefficients near the leading edge for a Mach number of 0.75 and a null Cz for an 8% relative thickness profile of the family in accordance with the invention and prior art profiles having the same relative thickness.

FIG. 8 shows the evolution of the leading edge overspeed expressed as a pressure coefficient Kp for various 8% relative thickness profiles at Mach 0.4 and a lift coefficient of 1, typical downwind blade operating conditions for these profiles. FIG. 9 shows them for Mach 0.75 and a null lift coefficient, typical upwind blade operating conditions. The pressure distributions were calculated using an Euler calculation method allowing for viscosity effects and using the dimensions of the profiles obtained from the documents previously cited.

These figures clearly show that the profile of the family in accordance with the invention (continuous line) obtains good upwind and downwind blade performance. Compared to the prior art profiles (dashed line) the profile in accordance with the invention has comparable overspeed at low Mach numbers and high Cz values and will therefore have a close maximum Cz because the recompression laws after overspeed are similar, but will have lower drag and a higher drag divergence Mach number than the profiles previously cited because the overspeed is lower than that of the other profiles at the intrados at high Mach numbers and low Cz values. Compared to the prior art profile shown in chain dotted line, the profile in accordance with the invention has significantly lower overspeed at M=0.4 and will therefore have a much higher maximal lift.

Figure 10:
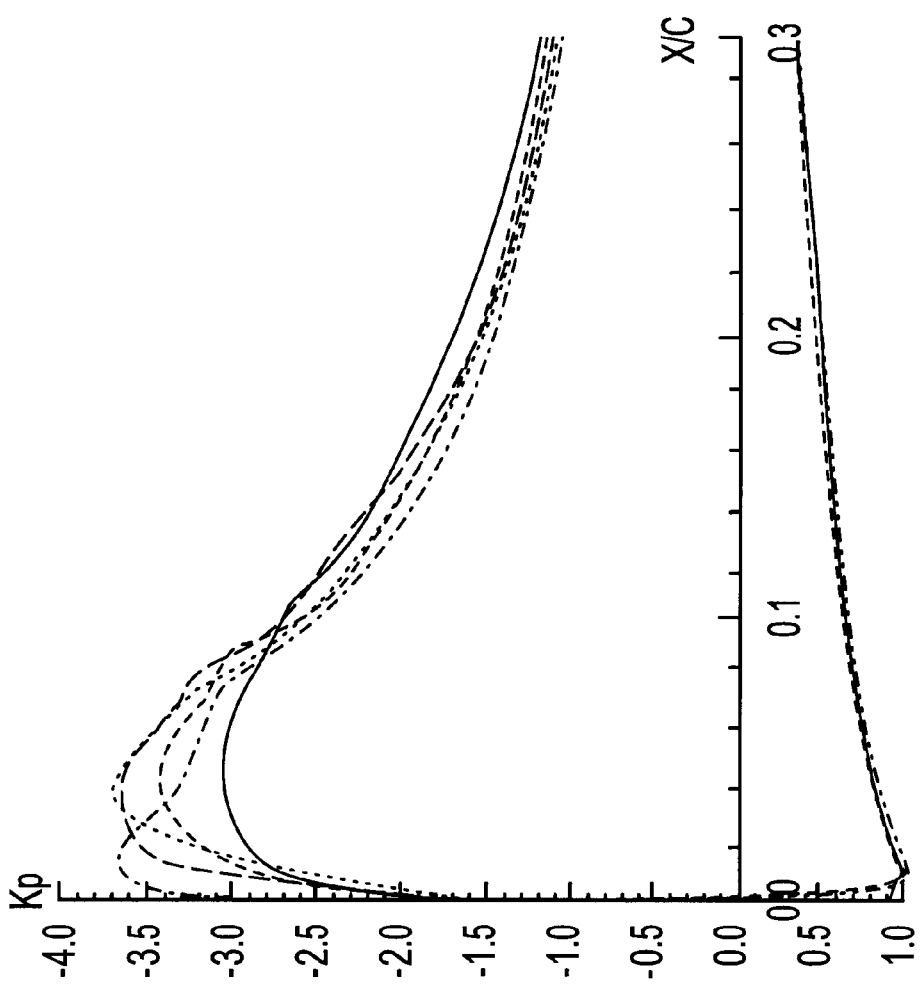
FIG. 10 is a diagram showing the pressure coefficients near the leading edge for a Mach number of 0.4 and a Cz of 1.25 for a 12% relative thickness profile of the family in accordance with the invention and prior art profiles having the same relative thickness.
Figure 11:
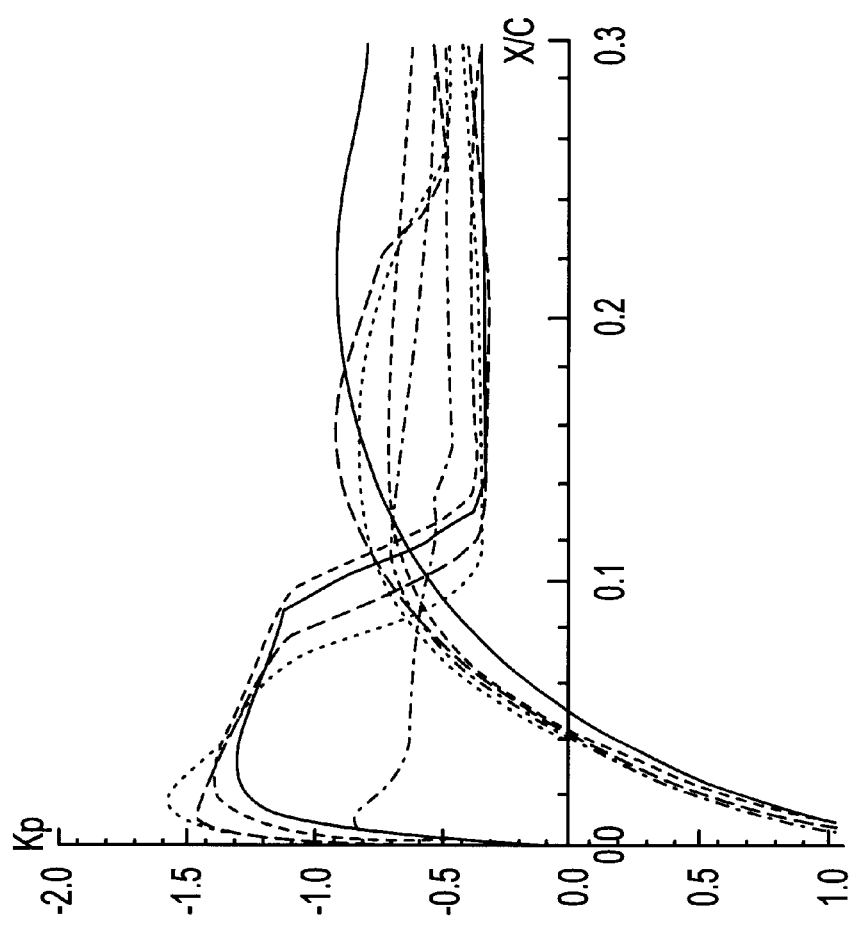
FIG. 11 is a diagram showing the pressure coefficients near the leading edge for a Mach number of 0.75 and a null Cz for a 12% relative thickness profile of the family in accordance with the invention and prior art profiles having the same relative thickness.

FIG. 10 shows the extrados overspeed near the leading edge for a 12% profile from the family in accordance with the invention and for prior art profiles for typical downwind blade operating conditions of M=0.4 and Cz=1.25. FIG. 11 shows for the same profiles the overspeed near the leading edge for typical upwind blade operating conditions of M=0.75 and Cz _0.

FIG. 10 clearly shows that the profile of the family in accordance with the invention (continuous line) has a significantly lower overspeed than the other profiles (dashed line) and consequently will have the highest maximal lift, enabling the blade to operate correctly over a more extended flight envelope. This excellent performance at low speeds is obtained with high upwind blade performance, as shown in FIG. 11, since the profile of the family in accordance with the invention (continuous line) has intrados overspeed at low values of Cz and high Mach numbers in the same order of magnitude as, or even lower than, those of the other profiles (dashed line).

Figure 12:
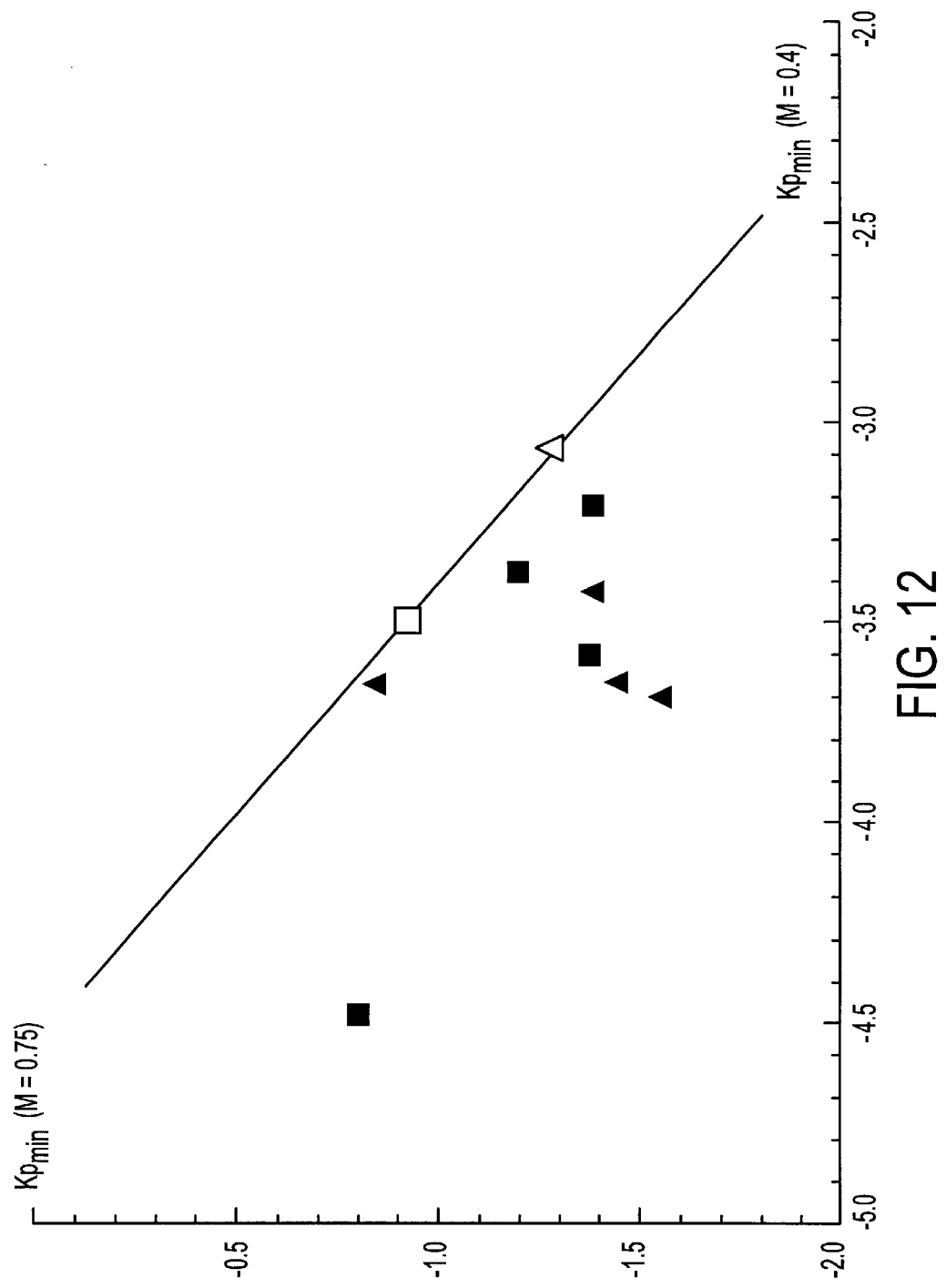
FIG. 12 is a diagram showing the values of the minimal pressure coefficient at the intrados for a Mach number of 0.75 and a null Cz as a function of the value of the minimal pressure coefficient at the extrados for a Mach number of 0.4 and a Cz equal to 1 for 8% relative thickness profiles and Cz equal to 1.25 for 12% relative thickness profiles of the family in accordance with the invention and for prior art profiles having the same relative thickness.

The preceding figures show clearly that the family of profiles in accordance with the invention achieves an excellent compromise between upwind and downwind blade operating requirements, regardless of the relative thickness, that is to say the spanwise position of the profile in question. It is made evident in FIG. 12 where the compromise yields a diagram in which the Y axis shows the intrados overspeed ($Kp_{min}$) at Mach 0.75 and Cz=0 (upwind blade) and the X axis shows the extrados overspeed ($Kp_{min}$) at Mach 0.4 and Cz=1 for the 8% profile (white square) and Cz=1.25 for the 12% profile (white triangle) having a relative thickness in accordance with the invention (downwind blade) and the same relative thickness profiles of the prior art (black squares and triangles). Note that all the prior art profiles are to the left of the line joining the points representing the 8% and 12% profiles of the family in accordance with the invention, indicating that the family in accordance with the invention offers better performance throughout the range of operation of the profiles.

Figure 13:
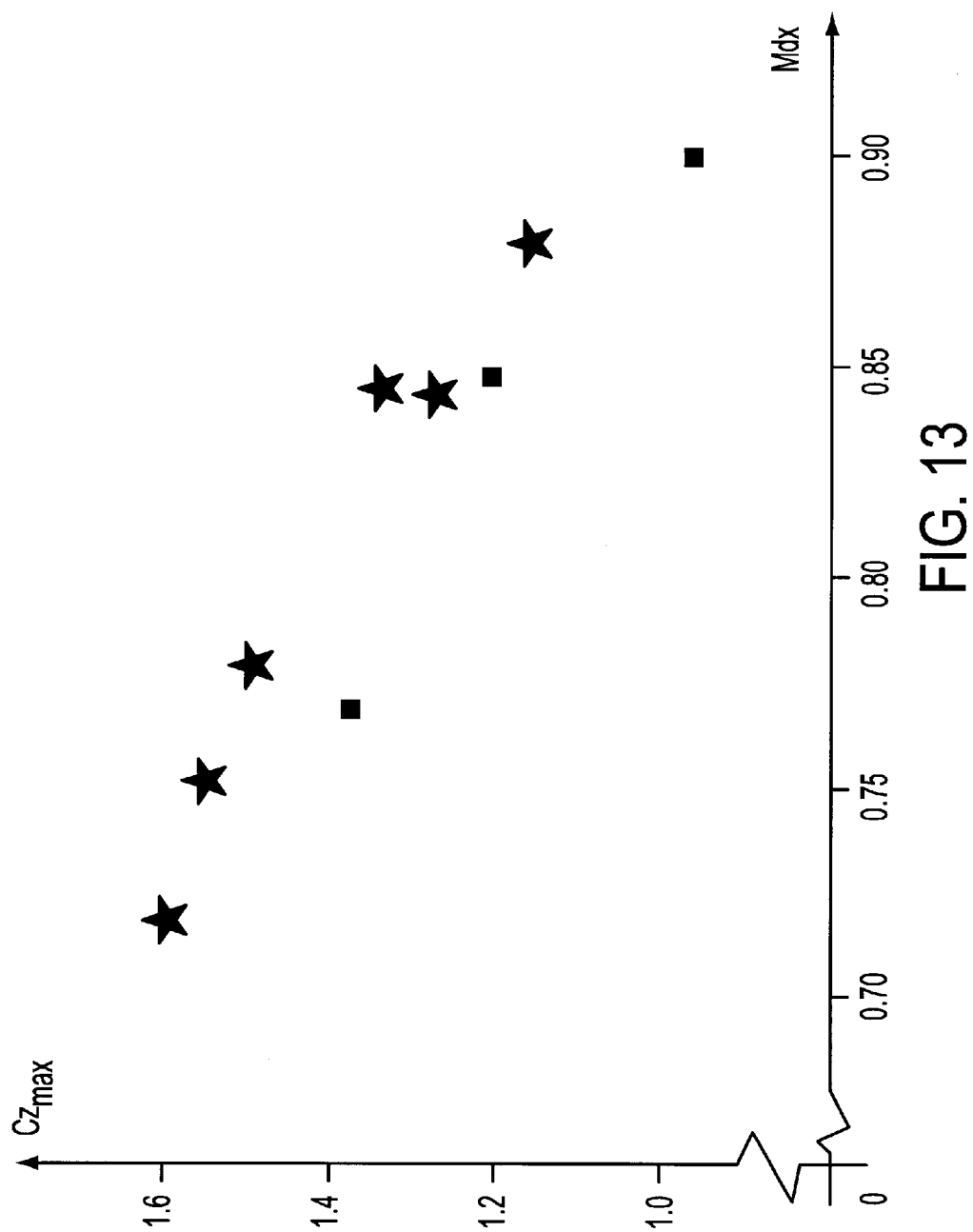
FIG. 13 is a diagram of performance as measured in a wind tunnel showing the maximal lift coefficients ($Cz_{max}$) at Mach 0.4 and the drag divergence Mach numbers (Mdx) at Cz=0 for profiles of a prior art family and of the family in accordance with the invention.

FIG. 13 shows the improvement in performance obtained with the family in accordance with the invention over the family described in French patents 2 463 054 and 2 485 470.

The profiles in accordance with the invention (stars) and the prior art profiles (squares) were tested in the same wind tunnel with the same Reynolds numbers on models of the same size. The measured performances are therefore entirely comparable. It can clearly be seen that the particular features of the family in accordance with the invention yield significant improvements over the prior art family. Accordingly, for the same drag divergence Mach number the family in accordance with the invention improves maximal lift at M=0.4 by an amount in the order of 0.15 or at the same maximal lift an improvement in zero lift drag divergence Mach number of 0.04. Using this family of profiles therefore improves the performance of the rotor blades and therefore that of the aircraft.

Compared to the prior art profiles, the family of blade profiles in accordance with the invention can be used to design blades for operation at higher flying speeds with reduced power without risk of boundary layer separation at the downwind blade. The new family also enables operation at lower rotation speeds to reduce noise levels because the maximal lift levels of the set of profiles are raised.

The present invention therefore concerns a family of profiles with maximal relative thickness in the range 7% to 15% of the chord, the various particular features of said family of profiles conferring high performance on all the profiles at low lift levels and at high Mach numbers as well as at low Mach numbers and high lift levels. These various particular features of the family of profiles in accordance with the invention can be used to design blades having high performance for a very wide range of operating conditions combined with very low upwind blade pitch moment levels, so reducing twisting of the blade and the forces on the pitch control rods. These very low levels of the pitch moment are obtained without using artifices such as trailing edge flap deflection or particular shapes of the profile at this location, which increase drag and reduce maximal lift.

The dimensions set out in the following tables can advantageously be used to define and generate profiles of the family in accordance with the invention easily. These dimensions define, for a chord length equal to unity, the evolution of the intrados (X coordinate $X_{int}$, Y coordinate $Y_{int}$) and the extrados (X coordinate $X_{ext}$, Y coordinate $Y_{ext}$) of various profiles of the family in accordance with the invention.

Table 1 gives these dimensions for a profile of the family in accordance with the invention having a relative thickness of 15%.

Table 2 gives these dimensions for a profile of the family in accordance with the invention having a relative thickness of 13%.

Table 3 gives these dimensions for a profile of the family in accordance with the invention having a relative thickness of 12%.

Tables 4 and 5 give the dimensions of two profiles of the family in accordance with the invention having a relative thickness of 9%. The first profile has a slightly greater maximal camber than the second profile, which gives it a slightly higher maximal lift, and can therefore be used at more inboard positions on the blade.

Table 6 gives these dimensions for a profile of the family in accordance with the invention having a relative thickness of 7%.

Profiles of the family in accordance with the invention for other relative thicknesses are advantageously obtained by interpolation from the dimensions of the profiles given in the aforementioned tables. Accordingly, to obtain the Y coordinates of an 8% relative thickness profile, take half the sum of the 7% and 9% profile Y coordinates at the same X coordinate. This interpolation technique preserves the particular features of the family in accordance with the invention for all profiles.

All the profiles of the family defined in this way have not only high performance in all operating conditions but also extremely low pitch moment coefficients at low values of Cz, without using trailing edge flaps which reduce maximal lift.

The particular features of the family in accordance with the invention can also be used to generate a profile having higher pitch moments (nose-up) for particular applications. For example table 7 gives the dimensions of an 11% relative thickness profile having a nose-up pitch moment coefficient of +0.05. The particular features of the family of profiles in accordance with the invention confer good performance on this profile at low Mach numbers and high Cz values despite the nose-up pitch moment coefficient. Other profiles for relative thicknesses in the range 9% to 13% and having similar pitch moment coefficients can advantageously be generated by applying a coefficient of proportionality to the Y coordinates of the dimensions from table 7. Accordingly, for a 9% relative thickness profile, a coefficient of 9/11 could be applied to the Y coordinates of the dimensions from table 7. For a 13% profile a coefficient of 13/11 could be applied to the Y coordinates of the dimensions from table 7.

To summarise, and to synthesise the concepts described above, it seems that, to increase the maximal lift coefficient of a profile, it is necessary to increase its relative thickness and camber, but the position of the maximum camber and its value must be adjusted to suit the relative thickness, that is to say the position of the profile on the blade. Accordingly, for sections near the blade root and out to mid-span, for which the relative Mach numbers are moderate but which must have high maximal lift coefficients to avoid boundary layer separation at the downwind blade, profiles with relative thicknesses in the range 12% to 15% will be chosen with maximal camber positions beyond 20% of the chord and maximal camber values greater than 2.3% of the chord. On the other hand, for profiles between mid-span and the blade tip, for which the relative Mach numbers are higher and the lift levels lower, profiles will be chosen having relative thicknesses in the range 7% to 12% with maximal camber positions short of 20% of the chord and maximal camber values less than 2% of the chord. Accordingly, for these profiles, high upwind blade performance is obtained with low levels of drag and high drag divergence Mach numbers combined with satisfactory downwind blade performance.

To achieve good performance at high Mach numbers and at low lift levels requires profiles having small variations in thickness between 20% of the chord and the position of the maximal thickness to avoid the formation of intense shock waves at the extrados and at the intrados. However, this reduces performance at low Mach numbers and high Cz values because recompression at the extrados is not optimal. Accordingly, it will again be of benefit to adjust the evolution of the thickness of the profile between 20% of the chord and the position of the maximal thickness as a function of the relative thickness of the profile, that is to say its spanwise position on the blade.

TABLE 1

| Xint | Yint | Xext | Yext |
| --- | --- | --- | --- |
| 0.0000000 | 0.0000000 | 0.0000000 | 0.0000000 |
| 0.0005618 | −0.0047861 | 0.0010074 | 0.0070110 |
| 0.0020133 | −0.0086833 | 0.0031804 | 0.0128559 |
| 0.0039999 | −0.0118075 | 0.0064770 | 0.0190511 |
| 0.0062089 | −0.0142795 | 0.0109192 | 0.0255441 |
| 0.0084600 | −0.0162582 | 0.0165578 | 0.0322846 |
| 0.0106796 | −0.0178799 | 0.0234600 | 0.0392114 |
| 0.0128586 | −0.0192464 | 0.0317071 | 0.0462450 |
| 0.0150204 | −0.0204345 | 0.0413858 | 0.0532865 |
| 0.0172062 | −0.0215035 | 0.0525785 | 0.0602213 |
| 0.0194674 | −0.0225005 | 0.0653633 | 0.0669160 |
| 0.0218632 | −0.0234613 | 0.0798042 | 0.0732303 |
| 0.0244570 | −0.0244127 | 0.0959330 | 0.0790717 |
| 0.0273161 | −0.0253733 | 0.1137575 | 0.0844065 |
| 0.0305100 | −0.0263540 | 0.1332907 | 0.0891990 |
| 0.0341096 | −0.0273602 | 0.1545426 | 0.0934303 |
| 0.0381862 | −0.0283939 | 0.1775258 | 0.0970679 |
| 0.0428111 | −0.0294538 | 0.2022496 | 0.1000741 |
| 0.0480558 | −0.0305359 | 0.2287162 | 0.1024112 |
| 0.0539920 | −0.0316316 | 0.2569190 | 0.1040441 |

TABLE 1-continued

| Xint | Yint | Xext | Yext |
| --- | --- | --- | --- |
| 0.0606909 | −0.0327283 | 0.2868397 | 0.1049407 |
| 0.0682235 | −0.0338107 | 0.3184458 | 0.1050728 |
| 0.0766588 | −0.0348653 | 0.3516889 | 0.1044157 |
| 0.0860650 | −0.0358817 | 0.3865006 | 0.1029460 |
| 0.0965083 | −0.0368549 | 0.4227889 | 0.1006352 |
| 0.1080535 | −0.0377824 | 0.4504323 | 0.0974324 |
| 0.1207641 | −0.0386632 | 0.4992754 | 0.0932751 |
| 0.1347018 | −0.0394980 | 0.5391286 | 0.0881391 |
| 0.1499256 | −0.0402898 | 0.5797675 | 0.0820418 |
| 0.1664918 | −0.0410424 | 0.6209309 | 0.0750418 |
| 0.1844530 | −0.0417596 | 0.6623179 | 0.0672428 |
| 0.2038574 | −0.0424412 | 0.7035880 | 0.0587975 |
| 0.2247478 | −0.0430810 | 0.7443573 | 0.0499113 |
| 0.2471602 | −0.0436657 | 0.7841966 | 0.0408420 |
| 0.2711227 | −0.0441791 | 0.8226272 | 0.0318993 |
| 0.2966531 | −0.0446070 | 0.8591139 | 0.0234320 |
| 0.3237578 | −0.0449396 | 0.8930389 | 0.0157286 |
| 0.3524293 | −0.0451596 | 0.9236759 | 0.0089118 |
| 0.3826449 | −0.0452234 | 0.9503337 | 0.0035505 |
| 0.4143623 | −0.0450682 | 0.9723281 | 0.0020000 |
| 0.4475175 | −0.0446448 | 0.9884801 | 0.0020000 |
| 0.4820218 | −0.0439432 | 0.9977057 | 0.0020000 |
| 0.5177580 | −0.0429063 | 1.0000000 | 0.0020000 |
| 0.5545756 | −0.0414566 | | |
| 0.5922874 | −0.0395269 | | |
| 0.6306641 | −0.0370422 | | |
| 0.6694330 | −0.0339526 | | |
| 0.7082751 | −0.0302550 | | |
| 0.7468266 | −0.0260106 | | |
| 0.7846834 | −0.0213969 | | |
| 0.8214063 | −0.0167411 | | |
| 0.8564980 | −0.0123661 | | |
| 0.8893883 | −0.0085190 | | |
| 0.9194329 | −0.0053961 | | |
| 0.9459121 | −0.0030839 | | |
| 0.9680430 | −0.0020000 | | |
| 0.9849725 | −0.0020000 | | |
| 0.9957821 | −0.0020000 | | |
| 1.0000000 | −0.0020000 | | |

TABLE 2

| Xint | Yint | Xext | Yext |
| --- | --- | --- | --- |
| 0.0000891 | 0.0027841 | 0.0000891 | 0.0027841 |
| 0.0002172 | 0.0013141 | 0.0001350 | 0.0043218 |
| 0.0015133 | −0.0025465 | 0.0012345 | 0.0092088 |
| 0.0036367 | −0.0055021 | 0.0035931 | 0.0143655 |
| 0.0060472 | −0.0077063 | 0.0070912 | 0.0197190 |
| 0.0084814 | −0.0093849 | 0.0116887 | 0.0252444 |
| 0.0108499 | −0.0107134 | 0.0173949 | 0.0309227 |
| 0.0131472 | −0.0118074 | 0.0242511 | 0.0367252 |
| 0.0154054 | −0.0127431 | 0.0323202 | 0.0426037 |
| 0.0176734 | −0.0135741 | 0.0416752 | 0.0484919 |
| 0.0200086 | −0.0143399 | 0.0523874 | 0.0543151 |
| 0.0224737 | −0.0150704 | 0.0645290 | 0.0599805 |
| 0.0251348 | −0.0157868 | 0.0781676 | 0.0653826 |
| 0.0280602 | −0.0165021 | 0.0933566 | 0.0704258 |
| 0.0313197 | −0.0172241 | 0.1101364 | 0.0750287 |
| 0.0349840 | −0.0179559 | 0.1285397 | 0.0791188 |
| 0.0391235 | −0.0186982 | 0.1485912 | 0.0826372 |
| 0.0438089 | −0.0194501 | 0.1703087 | 0.0855425 |
| 0.0491104 | −0.0202102 | 0.1937041 | 0.0878114 |
| 0.0550983 | −0.0209743 | 0.2187835 | 0.0894425 |
| 0.0618426 | −0.0217369 | 0.2455476 | 0.0904540 |
| 0.0694126 | −0.0224930 | 0.2739908 | 0.0908724 |
| 0.0778767 | −0.0232396 | 0.3040984 | 0.0907184 |
| 0.0873025 | −0.0239777 | 0.3358428 | 0.0900006 |
| 0.0977563 | −0.0247121 | 0.3691793 | 0.0887110 |
| 0.1093032 | −0.0254500 | 0.4040416 | 0.0868221 |
| 0.1220069 | −0.0261993 | 0.4403372 | 0.0842939 |
| 0.1359293 | −0.0269693 | 0.4779434 | 0.0810740 |
| 0.1511296 | −0.0277699 | 0.5167014 | 0.0770917 |
| 0.1676644 | −0.0286097 | 0.5564131 | 0.0722792 |

TABLE 2-continued

| Xint | Yint | Xext | Yext |
|---|---|---|---|
| 0.1855865 | −0.0294939 | 0.5968396 | 0.0665944 |
| 0.2049444 | −0.0304227 | 0.6377000 | 0.0600373 |
| 0.2257812 | −0.0313878 | 0.6786754 | 0.0526819 |
| 0.2481338 | −0.0323713 | 0.7194122 | 0.0446959 |
| 0.2720310 | −0.0333478 | 0.7595229 | 0.0363436 |
| 0.2974920 | −0.0342855 | 0.7985795 | 0.0279608 |
| 0.3245243 | −0.0351452 | 0.8361021 | 0.0199293 |
| 0.3531218 | −0.0358781 | 0.8715494 | 0.0126615 |
| 0.3832621 | −0.0364293 | 0.9042991 | 0.0065265 |
| 0.4149035 | −0.0367448 | 0.9336395 | 0.0016899 |
| 0.4479821 | −0.0367779 | 0.9587540 | −0.0013452 |
| 0.4824094 | −0.0364939 | 0.9787074 | −0.0019526 |
| 0.5180687 | −0.0358730 | 0.9924748 | −0.0014413 |
| 0.5548126 | −0.0349150 | 0.9993106 | −0.0011316 |
| 0.5924599 | −0.0336388 | 1.0000000 | −0.0011003 |
| 0.6307913 | −0.0320774 | | |
| 0.6695459 | −0.0302750 | | |
| 0.7084165 | −0.0282760 | | |
| 0.7470445 | −0.0261113 | | |
| 0.7850155 | −0.0237905 | | |
| 0.8218558 | −0.0213070 | | |
| 0.8570300 | −0.0186551 | | |
| 0.8899292 | −0.0157574 | | |
| 0.9198689 | −0.0124362 | | |
| 0.9461870 | −0.0091919 | | |
| 0.9681802 | −0.0068617 | | |
| 0.9850296 | −0.0057928 | | |
| 0.9957981 | −0.0052912 | | |
| 1.0000000 | −0.0051003 | | |

TABLE 3

| Xint | Yint | Xext | Yext |
|---|---|---|---|
| 0.0000739 | −0.0013128 | 0.0000739 | −0.0013128 |
| 0.0000966 | −0.0022595 | 0.0001401 | −0.0000894 |
| 0.0005894 | −0.0038727 | 0.0009167 | 0.0040673 |
| 0.0017123 | −0.0062133 | 0.0025764 | 0.0083432 |
| 0.0032959 | −0.0084863 | 0.0051172 | 0.0128506 |
| 0.0051085 | −0.0103179 | 0.0085476 | 0.0175796 |
| 0.0070472 | −0.0118403 | 0.0129012 | 0.0225127 |
| 0.0090840 | −0.0131503 | 0.0182309 | 0.0276268 |
| 0.0112365 | −0.0143169 | 0.0246051 | 0.0328853 |
| 0.0135466 | −0.0153866 | 0.0321044 | 0.0382312 |
| 0.0160688 | −0.0163897 | 0.0408105 | 0.0435950 |
| 0.0188624 | −0.0173500 | 0.0507980 | 0.0489034 |
| 0.0219889 | −0.0182906 | 0.0621416 | 0.0540645 |
| 0.0255132 | −0.0192284 | 0.0749128 | 0.0589699 |
| 0.0295035 | −0.0201697 | 0.0891668 | 0.0635267 |
| 0.0340297 | −0.0211133 | 0.1049426 | 0.0676699 |
| 0.0391620 | −0.0220563 | 0.1222725 | 0.0713490 |
| 0.0449693 | −0.0229985 | 0.1411846 | 0.0745237 |
| 0.0515209 | −0.0239389 | 0.1617031 | 0.0771678 |
| 0.0588862 | −0.0248698 | 0.1838480 | 0.0792709 |
| 0.0671345 | −0.0257807 | 0.2076351 | 0.0808425 |
| 0.0763339 | −0.0266634 | 0.2330754 | 0.0819199 |
| 0.0865513 | −0.0275154 | 0.2601745 | 0.0825569 |
| 0.0978517 | −0.0283413 | 0.2889307 | 0.0827985 |
| 0.1102992 | −0.0291474 | 0.3193316 | 0.0826744 |
| 0.1239562 | −0.0299393 | 0.3513499 | 0.0822032 |
| 0.1388829 | −0.0307234 | 0.3849386 | 0.0813482 |
| 0.1551370 | −0.0315074 | 0.4200259 | 0.0800233 |
| 0.1727725 | −0.0322991 | 0.4565125 | 0.0781477 |
| 0.1918394 | −0.0331025 | 0.4942651 | 0.0756229 |
| 0.2123829 | −0.0339152 | 0.5331116 | 0.0723247 |
| 0.2344417 | −0.0347235 | 0.5728394 | 0.0681569 |
| 0.2580474 | −0.0355049 | 0.6132025 | 0.0631287 |
| 0.2832221 | −0.0362357 | 0.6539182 | 0.0573281 |
| 0.3099766 | −0.0368972 | 0.6946482 | 0.0507938 |
| 0.3383083 | −0.0374816 | 0.7350004 | 0.0435690 |
| 0.3681998 | −0.0379649 | 0.7745398 | 0.0357884 |
| 0.3996165 | −0.0382796 | 0.8127946 | 0.0276979 |
| 0.4325022 | −0.0383649 | 0.8492672 | 0.0197011 |
| 0.4667767 | −0.0381841 | 0.8834384 | 0.0123955 |

TABLE 3-continued

| Xint | Yint | Xext | Yext |
|---|---|---|---|
| 0.5023327 | −0.0377126 | 0.9147312 | 0.0064860 |
| 0.5390326 | −0.0369390 | 0.9424376 | 0.0025621 |
| 0.5767054 | −0.0358679 | 0.9656731 | 0.0007637 |
| 0.6151425 | −0.0345139 | 0.9834353 | 0.0005088 |
| 0.6540947 | −0.0329091 | 0.9947859 | 0.0008151 |
| 0.6932692 | −0.0311321 | 1.0000000 | 0.0010431 |
| 0.7323196 | −0.0291836 | | |
| 0.7708274 | −0.0267733 | | |
| 0.8083142 | −0.0236974 | | |
| 0.8442602 | −0.0200787 | | |
| 0.8780976 | −0.0161531 | | |
| 0.9092065 | −0.0121961 | | |
| 0.9369224 | −0.0085878 | | |
| 0.9605355 | −0.0058326 | | |
| 0.9792420 | −0.0041862 | | |
| 0.9921444 | −0.0033709 | | |
| 1.0000000 | −0.0029569 | | |

TABLE 4

| Xint | Yint | Xext | Yext |
|---|---|---|---|
| 0.0000000 | 0.0000000 | 0.0000000 | 0.0000000 |
| 0.0000656 | −0.0009004 | 0.0000016 | 0.0001426 |
| 0.0011314 | −0.0036988 | 0.0007888 | 0.0034530 |
| 0.0029421 | −0.0058379 | 0.0025796 | 0.0068517 |
| 0.0050023 | −0.0073408 | 0.0051253 | 0.0103370 |
| 0.0071395 | −0.0085006 | 0.0084148 | 0.0139345 |
| 0.0093364 | −0.0094521 | 0.0124940 | 0.0176285 |
| 0.0116161 | −0.0102832 | 0.0174176 | 0.0213995 |
| 0.0140252 | −0.0110537 | 0.0232490 | 0.0252183 |
| 0.0166240 | −0.0117954 | 0.0300607 | 0.0290365 |
| 0.0194778 | −0.0125281 | 0.0379237 | 0.0327993 |
| 0.0226540 | −0.0132669 | 0.0469026 | 0.0364537 |
| 0.0262203 | −0.0140242 | 0.0570566 | 0.0399515 |
| 0.0302455 | −0.0148104 | 0.0684342 | 0.0432730 |
| 0.0347990 | −0.0156331 | 0.0810813 | 0.0464143 |
| 0.0399501 | −0.0164972 | 0.0950506 | 0.0493488 |
| 0.0457690 | −0.0174046 | 0.1104005 | 0.0520111 |
| 0.0523257 | −0.0183523 | 0.1271886 | 0.0542966 |
| 0.0596909 | −0.0193319 | 0.1454615 | 0.0561184 |
| 0.0679348 | −0.0203300 | 0.1652498 | 0.0574947 |
| 0.0771266 | −0.0213328 | 0.1865819 | 0.0584813 |
| 0.0873340 | −0.0223288 | 0.2094865 | 0.0591270 |
| 0.0986234 | −0.0233115 | 0.2339881 | 0.0594972 |
| 0.1110588 | −0.0242762 | 0.2601057 | 0.0596635 |
| 0.1247032 | −0.0252196 | 0.2878491 | 0.0596755 |
| 0.1396165 | −0.0261397 | 0.3172160 | 0.0595416 |
| 0.1558565 | −0.0270353 | 0.3481885 | 0.0592329 |
| 0.1734772 | −0.0279045 | 0.3807300 | 0.0587007 |
| 0.1925287 | −0.0287407 | 0.4147829 | 0.0579156 |
| 0.2130501 | −0.0295309 | 0.4502663 | 0.0569007 |
| 0.2350979 | −0.0302558 | 0.4870723 | 0.0556787 |
| 0.2586855 | −0.0308981 | 0.5250582 | 0.0541710 |
| 0.2838397 | −0.0314516 | 0.5640407 | 0.0522197 |
| 0.3105572 | −0.0319197 | 0.6037951 | 0.0497093 |
| 0.3388773 | −0.0323063 | 0.6440558 | 0.0466139 |
| 0.3687409 | −0.0326053 | 0.6845104 | 0.0429448 |
| 0.4001273 | −0.0328018 | 0.7247946 | 0.0387182 |
| 0.4329814 | −0.0328779 | 0.7644886 | 0.0339633 |
| 0.4672250 | −0.0328110 | 0.8031139 | 0.0287322 |
| 0.5027526 | −0.0325552 | 0.8401384 | 0.0231434 |
| 0.5394277 | −0.0320299 | 0.8749838 | 0.0174261 |
| 0.5770785 | −0.0311589 | 0.9070294 | 0.0119231 |
| 0.6154959 | −0.0299273 | 0.9356153 | 0.0071082 |
| 0.6544303 | −0.0283770 | 0.9600000 | 0.0020000 |
| 0.6935871 | −0.0265450 | 0.9791919 | 0.0020000 |
| 0.7326199 | −0.0244346 | 0.9926438 | 0.0020000 |
| 0.7711270 | −0.0220246 | 1.0000000 | 0.0020000 |
| 0.8086463 | −0.0192760 | | |
| 0.8446529 | −0.0161505 | | |
| 0.8785621 | −0.0126752 | | |
| 0.9097404 | −0.0090236 | | |
| 0.9375173 | −0.0055546 | | |

TABLE 4-continued

| Xint | Yint | Xext | Yext |
|---|---|---|---|
| 0.9600000 | −0.0020000 | | |
| 0.9798900 | −0.0020000 | | |
| 0.9928896 | −0.0020000 | | |
| 1.0000000 | −0.0020000 | | |

TABLE 5

| Xint | Yint | Xext | Yext |
|---|---|---|---|
| 0.0000000 | 0.0000000 | 0.0000000 | 0.0000000 |
| 0.0000065 | −0.0003088 | 0.0000174 | 0.0005412 |
| 0.0004970 | −0.0023282 | 0.0005313 | 0.0034184 |
| 0.0016479 | −0.0043381 | 0.0017226 | 0.0063337 |
| 0.0033063 | −0.0060481 | 0.0035950 | 0.0093014 |
| 0.0052798 | −0.0074277 | 0.0061474 | 0.0123128 |
| 0.0074872 | −0.0085982 | 0.0093911 | 0.0153676 |
| 0.0099289 | −0.0096427 | 0.0133491 | 0.0184769 |
| 0.0126412 | −0.0106190 | 0.0180614 | 0.0216481 |
| 0.0156763 | −0.0115650 | 0.0235852 | 0.0248729 |
| 0.0190975 | −0.0124979 | 0.0299897 | 0.0281230 |
| 0.0229707 | −0.0134288 | 0.0373456 | 0.0313622 |
| 0.0273617 | −0.0143734 | 0.0457183 | 0.0345599 |
| 0.0323375 | −0.0153432 | 0.0551717 | 0.0376829 |
| 0.0379664 | −0.0163460 | 0.0657724 | 0.0406818 |
| 0.0443173 | −0.0173855 | 0.0775862 | 0.0434954 |
| 0.0514599 | −0.0184605 | 0.0906728 | 0.0460685 |
| 0.0594642 | −0.0195607 | 0.1050853 | 0.0483606 |
| 0.0684005 | −0.0206688 | 0.1208721 | 0.0503466 |
| 0.0783376 | −0.0217675 | 0.1380784 | 0.0520145 |
| 0.0893425 | −0.0228454 | 0.1567467 | 0.0533595 |
| 0.1014798 | −0.0238975 | 0.1769169 | 0.0543792 |
| 0.1148128 | −0.0249208 | 0.1986251 | 0.0550792 |
| 0.1294021 | −0.0259129 | 0.2219014 | 0.0554904 |
| 0.1453065 | −0.0268733 | 0.2467701 | 0.0556733 |
| 0.1625809 | −0.0278020 | 0.2732177 | 0.0556877 |
| 0.1812769 | −0.0286971 | 0.3013402 | 0.0555547 |
| 0.2014413 | −0.0295504 | 0.3310400 | 0.0552513 |
| 0.2231151 | −0.0303440 | 0.3623225 | 0.0547279 |
| 0.2463322 | −0.0310551 | 0.3951433 | 0.0539278 |
| 0.2711174 | −0.0316695 | 0.4294369 | 0.0528333 |
| 0.2974844 | −0.0321890 | 0.4651152 | 0.0515166 |
| 0.3254352 | −0.0326223 | 0.5020620 | 0.0500291 |
| 0.3549573 | −0.0329699 | 0.5401203 | 0.0482291 |
| 0.3860219 | −0.0332188 | 0.5790916 | 0.0459304 |
| 0.4185804 | −0.0333498 | 0.6187429 | 0.0431074 |
| 0.4525622 | −0.0333463 | 0.6588013 | 0.0398142 |
| 0.4878703 | −0.0331801 | 0.6989448 | 0.0360944 |
| 0.5243781 | −0.0327810 | 0.7388005 | 0.0320058 |
| 0.5619246 | −0.0320476 | 0.7779410 | 0.0276264 |
| 0.6003112 | −0.0309288 | 0.8158795 | 0.0230370 |
| 0.6393008 | −0.0294648 | 0.8520673 | 0.0183242 |
| 0.6786129 | −0.0277130 | 0.8858983 | 0.0136283 |
| 0.7179164 | −0.0256876 | 0.9167170 | 0.0091896 |
| 0.7568259 | −0.0233747 | 0.9438177 | 0.0053116 |
| 0.7948968 | −0.0207425 | 0.9664549 | 0.0027146 |
| 0.8316215 | −0.0177417 | 0.9837942 | 0.0020380 |
| 0.8664292 | −0.0143509 | 0.9948979 | 0.0020049 |
| 0.8986964 | −0.0106781 | 1.0000000 | 0.0020001 |
| 0.9277600 | −0.0070104 | | |
| 0.9529248 | −0.0038234 | | |
| 0.9734575 | −0.0022040 | | |
| 0.9884797 | −0.0019925 | | |
| 1.0000000 | −0.0020001 | | |

TABLE 6

| Xint | Yint | Xext | Yext |
|---|---|---|---|
| 0.0000000 | 0.0000000 | 0.0000000 | 0.0000000 |
| 0.0000682 | −0.0004000 | 0.0000101 | 0.0003255 |
| 0.0013444 | −0.0021640 | 0.0004974 | 0.0035496 |
| 0.0035193 | −0.0037558 | 0.0019864 | 0.0068826 |

TABLE 6-continued

| Xint | Yint | Xext | Yext |
|---|---|---|---|
| 0.0057969 | −0.0048451 | 0.0044593 | 0.0101699 |
| 0.0080611 | −0.0056936 | 0.0078262 | 0.0133715 |
| 0.0103320 | −0.0064091 | 0.0120386 | 0.0165006 |
| 0.0126599 | −0.0070501 | 0.0170918 | 0.0195820 |
| 0.0151052 | −0.0076512 | 0.0230157 | 0.0226236 |
| 0.0177343 | −0.0082310 | 0.0298640 | 0.0256048 |
| 0.0206152 | −0.0088006 | 0.0376965 | 0.0284954 |
| 0.0238162 | −0.0093701 | 0.0465686 | 0.0312744 |
| 0.0274062 | −0.0099492 | 0.0565372 | 0.0339203 |
| 0.0314543 | −0.0105436 | 0.0676625 | 0.0363970 |
| 0.0360300 | −0.0111574 | 0.0800043 | 0.0386600 |
| 0.0412030 | −0.0117934 | 0.0936186 | 0.0406729 |
| 0.0470427 | −0.0124527 | 0.1085572 | 0.0424119 |
| 0.0536188 | −0.0131335 | 0.1248694 | 0.0438669 |
| 0.0610007 | −0.0138301 | 0.1426020 | 0.0450371 |
| 0.0692577 | −0.0145340 | 0.1617999 | 0.0459257 |
| 0.0784547 | −0.0152383 | 0.1825047 | 0.0465361 |
| 0.0886683 | −0.0159392 | 0.2047531 | 0.0468822 |
| 0.0999546 | −0.0166371 | 0.2285762 | 0.0470047 |
| 0.1123811 | −0.0173329 | 0.2539980 | 0.0469662 |
| 0.1260106 | −0.0180269 | 0.2810332 | 0.0468137 |
| 0.1409033 | −0.0187200 | 0.3096850 | 0.0465535 |
| 0.1571170 | −0.0194131 | 0.3399418 | 0.0461893 |
| 0.1747060 | −0.0201069 | 0.3717755 | 0.0457734 |
| 0.1937205 | −0.0207965 | 0.4051349 | 0.0451158 |
| 0.2142058 | −0.0214689 | 0.4399478 | 0.0442293 |
| 0.2362007 | −0.0221016 | 0.4761182 | 0.0431907 |
| 0.2597368 | −0.0226733 | 0.5135188 | 0.0420016 |
| 0.2848355 | −0.0231761 | 0.5519823 | 0.0404955 |
| 0.3115073 | −0.0236161 | 0.5913019 | 0.0385374 |
| 0.3397502 | −0.0240011 | 0.6312329 | 0.0361299 |
| 0.3695473 | −0.0243301 | 0.6714869 | 0.0333073 |
| 0.4008643 | −0.0245927 | 0.7117246 | 0.0301003 |
| 0.4336468 | −0.0247734 | 0.7515550 | 0.0265630 |
| 0.4678170 | −0.0248489 | 0.7905307 | 0.0227668 |
| 0.5032708 | −0.0247776 | 0.8281437 | 0.0187848 |
| 0.5398730 | −0.0244948 | 0.8638236 | 0.0147058 |
| 0.5774540 | −0.0239375 | 0.8969434 | 0.0106834 |
| 0.6158064 | −0.0230982 | 0.9268227 | 0.0069570 |
| 0.6546825 | −0.0220233 | 0.9526327 | 0.0031402 |
| 0.6937890 | −0.0207456 | 0.9737920 | 0.0020000 |
| 0.7327815 | −0.0192589 | 0.9893243 | 0.0020000 |
| 0.7712608 | −0.0175379 | 0.9982207 | 0.0020000 |
| 0.8087683 | −0.0155377 | 1.0000000 | 0.0020000 |
| 0.8447826 | −0.0132062 | | |
| 0.8787209 | −0.0105405 | | |
| 0.9099464 | −0.0076751 | | |
| 0.9377702 | −0.0048343 | | |
| 0.9600000 | −0.0020000 | | |
| 0.9802624 | −0.0020000 | | |
| 0.9932809 | −0.0020000 | | |
| 1.0000000 | −0.0020000 | | |

TABLE 7

| Xint | Yint | Xext | Yext |
|---|---|---|---|
| 0.0000000 | 0.0000000 | 0.0000000 | 0.0000000 |
| 0.0000039 | −0.0002717 | 0.0000297 | 0.0008630 |
| 0.0005567 | −0.0033773 | 0.0007668 | 0.0044707 |
| 0.0018596 | −0.0059335 | 0.0024327 | 0.0082926 |
| 0.0035929 | −0.0079518 | 0.0049406 | 0.0122900 |
| 0.0055256 | −0.0095580 | 0.0082638 | 0.0164614 |
| 0.0075610 | −0.0108846 | 0.0124328 | 0.0207978 |
| 0.0096878 | −0.0120262 | 0.0175095 | 0.0252724 |
| 0.0119362 | −0.0130440 | 0.0235681 | 0.0298421 |
| 0.0143540 | −0.0139807 | 0.0306876 | 0.0344497 |
| 0.0169766 | −0.0148687 | 0.0389461 | 0.0390251 |
| 0.0199282 | −0.0157320 | 0.0484169 | 0.0434917 |
| 0.0232105 | −0.0165895 | 0.0591637 | 0.0477770 |
| 0.0269109 | −0.0174574 | 0.0712386 | 0.0518254 |
| 0.0310971 | −0.0183468 | 0.0846848 | 0.0556027 |
| 0.0358383 | −0.0192633 | 0.0995435 | 0.0590830 |
| 0.0412047 | −0.0202090 | 0.1158582 | 0.0622299 |

TABLE 7-continued

| Xint | Yint | Xext | Yext |
|---|---|---|---|
| 0.0472658 | −0.0211839 | 0.1336727 | 0.0649899 |
| 0.0540919 | −0.0221849 | 0.1530273 | 0.0673041 |
| 0.0617526 | −0.0232069 | 0.1739544 | 0.0691288 |
| 0.0703172 | −0.0242440 | 0.1964792 | 0.0704434 |
| 0.0798537 | −0.0252907 | 0.2206207 | 0.0712398 |
| 0.0904291 | −0.0263444 | 0.2463918 | 0.0715101 |
| 0.1021090 | −0.0274048 | 0.2737965 | 0.0712564 |
| 0.1149571 | −0.0284739 | 0.3028290 | 0.0705038 |
| 0.1290354 | −0.0295552 | 0.3334714 | 0.0692831 |
| 0.1444033 | −0.0306529 | 0.3656894 | 0.0676017 |
| 0.1611174 | −0.0317700 | 0.3994277 | 0.0654384 |
| 0.1792308 | −0.0329072 | 0.4346063 | 0.0627563 |
| 0.1987921 | −0.0340610 | 0.4711177 | 0.0595183 |
| 0.2198446 | −0.0352229 | 0.5088250 | 0.0557033 |
| 0.2424250 | −0.0363808 | 0.5475596 | 0.0513219 |
| 0.2665614 | −0.0375208 | 0.5871195 | 0.0464273 |
| 0.2922725 | −0.0386289 | 0.6272674 | 0.0411129 |
| 0.3195652 | −0.0396905 | 0.6677238 | 0.0355038 |
| 0.3484326 | −0.0406864 | 0.7081639 | 0.0297508 |
| 0.3788523 | −0.0415899 | 0.7482107 | 0.0240269 |
| 0.1407831 | −0.0423658 | 0.7874312 | 0.0185229 |
| 0.4441625 | −0.0429684 | 0.8253295 | 0.0134350 |
| 0.4789029 | −0.0433360 | 0.8613409 | 0.0089499 |
| 0.5148879 | −0.0433888 | 0.8948292 | 0.0052395 |
| 0.5519680 | −0.0430402 | 0.9250708 | 0.0022748 |
| 0.5899562 | −0.0422203 | 0.9599635 | −0.0011348 |
| 0.6286253 | −0.0408875 | 0.9836177 | 0.0007215 |
| 0.6677034 | −0.0390138 | 0.9948411 | 0.0016037 |
| 0.7068691 | −0.0365552 | 1.0000000 | 0.0020022 |
| 0.7457439 | −0.0334409 | | |
| 0.7838918 | −0.0296217 | | |
| 0.8208269 | −0.0251658 | | |
| 0.8560259 | −0.0203202 | | |
| 0.8889307 | −0.0154776 | | |
| 0.9189308 | −0.0110628 | | |
| 0.9453259 | −0.0073064 | | |
| 0.9792565 | −0.0036252 | | |
| 0.9921480 | −0.0025950 | | |
| 1.0000000 | −0.0020022 | | |

What is claimed is:

1. A blade profile for a rotor craft rotor comprising:

between a leading edge and a trailing edge, an extrados and an intrados having a camber c defined by the geometrical locus of points equidistant from them;

wherein the ratio of the maximal camber to the maximal thickness varies as a linear function of the relative thickness of the profile, said function being represented by the equation $$(c/C)_{max}/(e/C)_{max}=a_3+b_3(e/C)_{max}$$

wherein:
C is the length of the chord of the profile,
c is the camber of the profile,
e is the thickness of the profile,
$a_3$ and $b_3$ are coefficients having respective values determined such that said ratio is in a range 0.13 to 0.19 for a relative thickness of 7% of the length C of the chord.

2. A blade profile according to claim 1, wherein a maximal relative thickness position is in the range 31% to 35% of the chord C.

3. A blade profile according to claim 1, wherein the value of the coefficient $a_3$ is 0.1177 and the value of the coefficient $b_3$ is 0.6114.

4. A blade profile according to claim 1, wherein the position $Xc_{max}$ of the maximal camber varies as a second linear function of the relative thickness of the profile, said second linear function being represented by the equation $$\frac{Xc_{max}}{C} = a_2 + b_2(e/C)_{max}$$

wherein $a_2$ and $b_2$ are coefficients having respective values determined such that said position is in the range 14% to 16% of the length C of the chord for said relative thickness of 7%.

5. A blade profile according to claim 4, wherein the value of the coefficient $a_2$ is 0.0321 and the value of the coefficient $b_2$ is 1.6499.

6. A blade profile according to claim 1, wherein the ratio between the thickness at 20% of the chord and the maximal thickness varies as a second linear function of the relative thickness of the profile, said second linear function being represented by the equation $$\frac{(e/C)}{(e/C)_{max}} = a_1 + b_1(e/C)_{max}, \text{ for } X/C = 20\%$$

wherein X is the coordinate of a point along the chord of the profile and $a_1$ and $b_1$ are coefficients having respective values determined such that said ratio is in the range 0.957 to 0.966 for said relative thickness of 7%.

7. A blade profile according to claim 6, wherein the value of the coefficient $a_1$ is 0.9779 and the value of the coefficient $b_1$ is −0.2305.

8. A blade profile for a rotor craft rotor comprising:

between a leading edge and a trailing edge, an extrados and an intrados having a camber c defined by the geometrical locus of points equidistant from them;

wherein the ratio of the maximal camber to the maximal thickness varies as a linear function of the relative thickness of the profile, said function being represented by the equation $$(c/C)_{max}/(e/C)_{max}=a_3+b_3(e/C)_{max}$$

wherein:
C is the length of the chord of the profile,
c is the camber of the profile,
e is the thickness of the profile,
$a_3$ and $b_3$ are coefficients having respective values determined such that said ratio is in a range 0.18 to 0.24 for a relative thickness of 15% of the length C of the chord.

9. A blade profile according to claim 8, wherein the value of the coefficient $a_3$ is 0.1177 and the value of the coefficient $b_3$ is 0.6114.

10. A blade profile according to claim 8, wherein the position $Xc_{max}$ of the maximal camber varies as a second linear function of the relative thickness of the profile, said second linear function being represented by the equation $$\frac{Xc_{max}}{C} = a_2 + b_2(e/C)_{max}$$

wherein $a_2$ and $b_2$ are coefficients having respective values determined such that said position is in the range 27% to 29% of the length C of the chord for said relative thickness of 15%.

11. A blade profile according to claim 10, wherein the value of the coefficient $a_2$ is 0.0321 and the value of the coefficient $b_2$ is 1.6499.

12. A blade profile according to claim 8, wherein the ratio between the thickness at 20% of the chord and the maximal thickness varies as a second linear function of the relative thickness of the profile, said second linear function being represented by the equation $$\frac{(e/C)}{(e/C)_{max}} = a_1 + b_1(e/C)_{max}, \text{ for } X/C = 20\%$$

wherein X is the coordinate of a point along the chord of the profile and $a_1$ and $b_1$ are coefficients having respective values determined such that said ratio is in the range 0.938 to 0.947 for said relative thickness of 15%.

13. A blade profile according to claim 12, wherein the value of the coefficient $a_1$ is 0.9779 and the value of the coefficient $b_1$ is −0.2305.

14. A blade profile according to claim 8, wherein a maximal relative thickness position is in the range 31% to 35% of the chord.

* * * * *